(12) United States Patent
Dehmann et al.

(10) Patent No.: US 8,515,962 B2
(45) Date of Patent: Aug. 20, 2013

(54) PHASED IMPORTING OF OBJECTS

(75) Inventors: Kai Dehmann, Rauenberg (DE); Peter Surma, Heidelberg (DE); Herbert Hackmann, Wiesloch (DE)

(73) Assignee: SAP AG, Walldorf (DE)

( * ) Notice: Subject to any disclaimer, the term of this patent is extended or adjusted under 35 U.S.C. 154(b) by 166 days.

(21) Appl. No.: 13/075,410

(22) Filed: Mar. 30, 2011

(65) Prior Publication Data

US 2012/0254739 A1 Oct. 4, 2012

(51) Int. Cl.
*G06F 17/30* (2006.01)
(52) U.S. Cl.
USPC ........... 707/741; 707/792; 707/793; 707/804; 707/756; 707/830
(58) Field of Classification Search
USPC ................. 707/741, 792, 793, 804, 756, 830, 707/999.1–10
See application file for complete search history.

(56) References Cited

U.S. PATENT DOCUMENTS

| | | | |
|---|---|---|---|
| 6,502,112 B1 * | 12/2002 | Baisley | 715/210 |
| 6,584,459 B1 * | 6/2003 | Chang et al. | 707/812 |
| 7,092,967 B1 * | 8/2006 | Pannala et al. | 1/1 |
| 2004/0044793 A1 | 3/2004 | Pauly et al. | |
| 2007/0271394 A1 | 11/2007 | Pauly et al. | |
| 2008/0046501 A1 | 2/2008 | Pauly et al. | |
| 2009/0112916 A1 | 4/2009 | Stuhec | |

OTHER PUBLICATIONS

'XML Schema Mapping' [online]. Stylus Studio, 2005-2011, [retrieved on Mar. 28, 2011]. Retrieved from the Internet: <URL: http://www.stylusstudio.com/xsd_to_xsd.html>, 2 pages.
'XML Schema Patterns for Common Data Structures' [online]. W3C, 2005, [retrieved on Mar. 28, 2011]. Retrieved from the Internet: <URL: http://www.w3.org/2005/07/xml-schema-patterns.html>, 10 pages.

* cited by examiner

*Primary Examiner* — Yicun Wu
(74) *Attorney, Agent, or Firm* — Fish & Richardson P.C.

(57) ABSTRACT

In general, the subject matter described in this specification can be embodied in methods, systems, and program products for importing objects. A computer system processes structured electronic documents that define objects to be imported into a database in multiple phases. In a first phase, the computer system analyzes the structured electronic documents to determine whether the objects to be imported are related to one or more other objects that have yet to be stored in the database. If so, the computer system generates contextual information that defines the relationships between the objects. In a second phase, the computer system establishes relationships in the database between related objects using the contextual information.

15 Claims, 7 Drawing Sheets

PHASED IMPORTING OF OBJECTS

TECHNICAL FIELD

This document generally relates to importing objects.

BACKGROUND

In some contexts, computer systems may store information as objects. Objects are individual instances of object types, which may include, for example, documents, folders, and other information object types.

In some cases, a user of a source computer system may wish to transfer one or more objects stored in the source computer system to another independent computer system. For example, in a public services context, one governmental agency may want to share large sets of documents with another governmental agency. Similarly, in a medical records context, a healthcare group may want to transfer medical records to another healthcare group. Although these examples generally relate to inter-organizational object transfers, intra-organizational transfers may also occur, such as when a legacy computer system transfers objects to a newer computer system within the same organization. In either of these types of transfers, the source computer system may store the objects differently than the computer system to which the objects are being transferred.

SUMMARY

This document describes techniques, methods, systems, and other mechanisms for importing objects, e.g., for importing objects that have been exported from a source computer system into a target computer system. A source computer system may export objects into an externally-readable format, e.g., Extensible Markup Language (XML) files that conform to an object model of the source computer system. The object model of the source computer system may be different from the object model of the target computer system. The exported XML files may represent the content of the object (e.g., the text of the document) as well as metadata associated with the object (e.g., attributes of the object, such as the author or creation date of a document). As one example of metadata associated with an object, the XML files may include relationship information that describes how the objects are related to other objects. For example, the XML file may contain hierarchical and referential relationships as metadata.

The order that the exported XML files arrive at a target computer system for importation cannot always be established in advance, which may cause some of the relationship information to be lost when the objects are imported into the target computer system. Furthermore, some of the information from the source computer system may not be easily represented in the target computer system.

According to the techniques described herein, the target computer system uses a phased approach to analyze the relationship information associated with the objects to be imported, and to establish the relationships between the objects in the target system, regardless of the order in which the XML files representing the objects are processed. Also, the target computer system converts object identifiers from the source computer system that are incompatible for use as an index in the target computer system into a format that is compatible for use as an index in the target computer system.

In general, one aspect of the subject matter described in this specification can be embodied in a computer-implemented method for importing objects. The method includes identifying, using a computer system, a plurality of structured electronic documents, each of which defines an object to be imported into a database. The method also includes processing, using the computer system, the plurality of structured electronic documents in a first phase that includes, for each of the structured electronic documents, analyzing the structured electronic document to obtain an identifier associated with the object to be imported, the identifier being incompatible for use as an index in the database. The first phase also includes generating a converted identifier from the identifier associated with the object to be imported, the converted identifier being compatible for use as an index in the database. The first phase further includes analyzing the structured electronic document to determine whether the object to be imported is related to one or more other objects defined by the plurality of structured electronic documents that have yet to be stored in the database, and if so, generating contextual information that defines a relationship between the object to be imported and the one or more other objects, the contextual information including the converted identifier and a relational identifier for each of the one or more other objects. The first phase also includes storing the object defined by the structured electronic document in the database. The method also includes processing, using the computer system, the contextual information in a second phase that includes at least establishing relationships in the database between related objects using the contextual information.

Additional aspects can optionally include one or more of the following features. The first phase processing and the second phase processing may execute in parallel. The first phase processing and the second phase processing may execute serially, with the first phase processing preceding the second phase processing. The method may also include, during the first phase processing, determining that the object to be imported is related to an object that is stored in the database, and establishing a relationship in the database between the object to be imported and the object that is stored in the database. In some implementations, generating the converted identifier may include hashing the identifier associated with the object to be imported. The method may also include simulating at least a portion of the first phase processing and the second phase processing without storing the objects in the database. In some implementations, a subset of the plurality of structured electronic documents may be used during the simulation, the subset being fewer than all of the plurality of structured electronic documents.

Other embodiments of the described aspects include corresponding computer-readable storage devices storing instructions that, when executed by one or more processing devices, perform operations according to the above-described methods. Other embodiments may include systems and apparatuses that include the described computer-readable storage devices and that are configured to execute the operations using one or more processing devices.

Particular embodiments can be implemented, in certain instances, to realize one or more of the following advantages. A user who is not familiar with the technical aspects associated with importing an object may execute the importation of any number of objects while maintaining the relationships between objects in the system. The relationship information may be captured and maintained regardless of the order the objects are imported. As such, the techniques described herein do not require additional processing to determine the order in which objects are to be imported. Furthermore, object identifiers from a source system need not be compatible with the target system when executing the techniques described herein.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes importing objects, e.g., into a records management system. More particularly, the examples below describe a phased approach to importing objects into a records management system, such that relationships between the objects may be maintained regardless of the order in which the objects are imported. Although the description below is described in the context of objects being transferred between records management systems, the techniques may also be applied to a variety of other contexts.

Objects may be transferred between source and target systems for a variety of different reasons. For example, objects may be transferred as part of a migration from a legacy records management system to a new system. As another example, objects may be transferred as part of a records transfer between different organizational entities. In addition to transfers such as those described above, objects may be imported into a records management system as a restoration of an object that was previously removed from the system.

In general, the source system may store objects in a format that is recognized by the records management system and by certain applications executing on the source computer system. However, the objects may not be stored in a format that is recognized by other records management systems. In order for the other applications and records management systems to utilize the objects from the source system, the objects may be exported from the source system in an externally-readable structured format that is understandable by the other systems.

One example of a structured electronic document format for use in this manner is an XML file that describes the contents of the object (e.g., the text of a document object) as well as metadata associated with the object. After the object has been exported to an XML file, other records management systems executing on target systems may be able to import the object using the techniques described herein.

Figure 1:
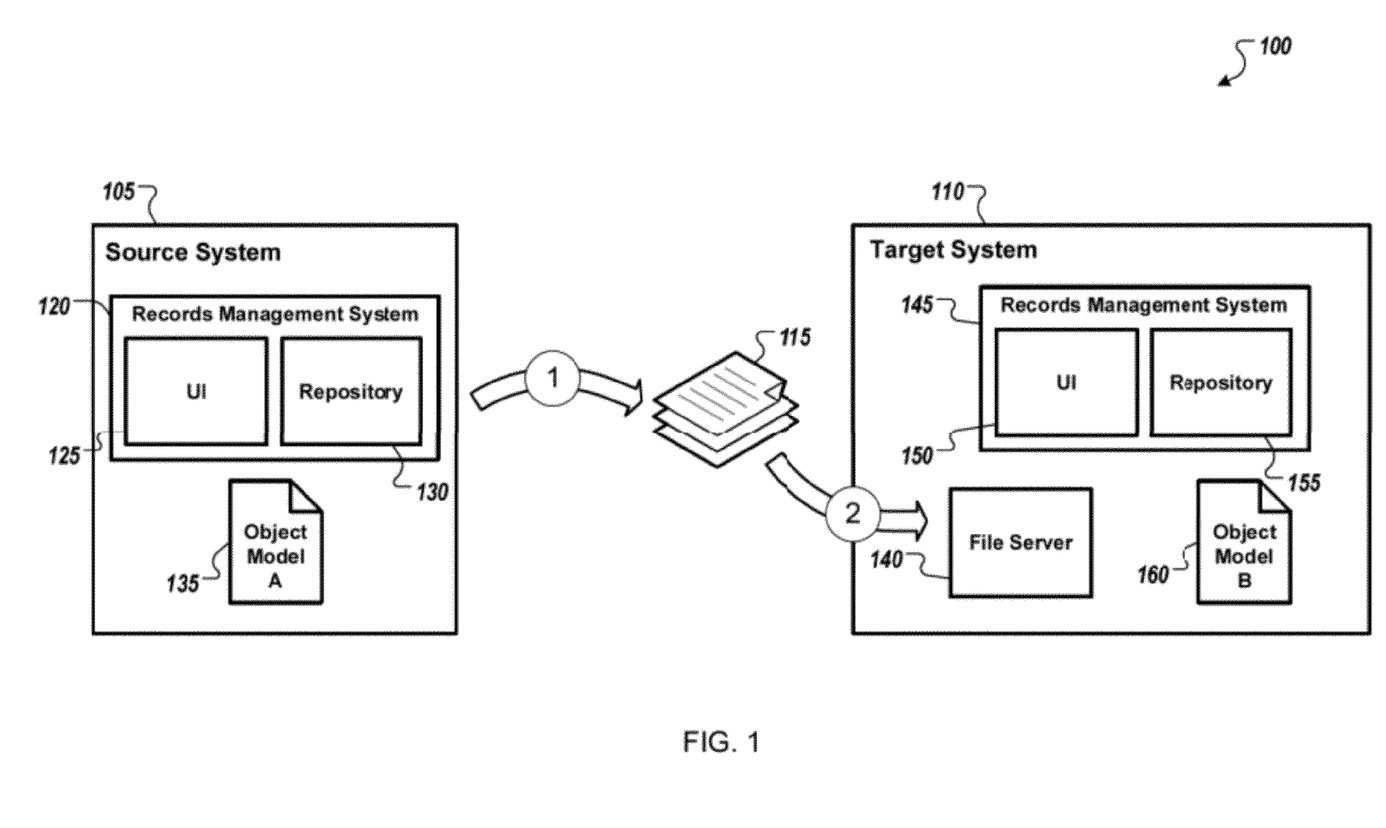
FIG. 1 shows a conceptual diagram of an example environment for importing objects from a source system into a target system.

FIG. 1 shows a conceptual diagram of an example environment 100 for importing objects from a source system 105 into a target system 110. As shown, source system 105 exports a set of structured electronic documents, e.g., XML files 115, that represent objects stored in the source system 105. The XML files 115 may then be stored by target system 110 for later importation into the target system.

The XML files 115 may include relationship metadata associated with the object. The relationship information may describe various types of relationships the objects may have to one another. For example, a hierarchical relationship may indicate that object A contains object B. As another example, a referential relationship may indicate that object A refers to object B in some way. Similarly, other types of logical relationships may exist between two or more objects, and the relationship information may be contained in the metadata of the XML files. The techniques described herein allow this relationship information to be imported into the records management system along with the objects, even if the order of the objects being imported into the system is unknown.

To do so, objects are imported using a phased approach. In the first phase, XML files that represent the objects are analyzed to identify various attributes associated with the objects. In this phase, various attributes may be mapped to corresponding fields of the target computer system according to a configuration defined for the import, and the objects may be stored in the computer system according to the mapping defined in the configuration.

Object identifiers that are to be used as an index during the import process may also be converted in the first phase to ensure that the identifiers are compatible for use in the target computer system. In the first phase, contextual information that defines the various relationships between objects may be stored separately from the object, e.g., in a work list that may be used during the second phase of processing. For example, the object identifiers and any relationship information identified in the XML files may be stored in the work list for further processing. In the second phase, the relationship information stored in the work list may be applied to the objects stored in the target records management system. When importing objects in this manner, the order of the objects as they are being imported does not affect the establishment of the relationship information in the records management system.

As an example to demonstrate how the phased approach operates, consider two objects to be imported—Object A is an instance of a folder object type and Object B is an instance of a document object type, and Document Object B is located in Folder Object A. Folder Object A does not contain any hierarchical relationship information about any of the objects contained therein. However, the objects that are contained in Folder Object A may include hierarchical information describing the relationship between the objects and Folder Object A in which they reside. In this instance, the XML file that defines Document Object B may contain relationship information that describes Document Object B's relationship to Folder Object A—namely, that Document Object B is a child of Folder Object A.

When Document Object B is imported into the system before Folder Object A, the relationship information about Document Object B's relationship with Folder Object A may initially be meaningless to the system because Folder Object A does not yet exist in the system. As such, assuming a non-phased approach to the document importation, the import may partially fail. Using the phased approach, however, the order of object importation does not matter. In the phased approach, Document Object B is imported into the system in a first phase, and its contextual information is stored in a work list that is generated during the first phase and processed during the second phase. During the first phase, Document Object B and Folder Object A are both imported into the system. Then, during the second phase, since Folder Object A exists in the system, the appropriate relationship information can be applied to both Document Object B and Folder Object A.

As shown in FIG. 1, source system 105 may include a records management system 120 that allows users to access various objects stored in the system. The records management system 120 may include a user interface 125 and an object repository 130. The user interface 125 may be a graphical user interface or other type of user interface that allows users of the records management system 120 to access objects stored in the repository 130. The objects in records management system 120 may conform to one or more object models. As shown, source system 105 utilizes object model A 135 to describe the objects contained in the records management system 120. Only one object model is shown for clarity of illustration, but source system 105 and records management system 120 may utilize any number of object models to define the objects stored in repository 130.

The object model utilized by a records management system may define the structure of a document describing various objects and object types. The object model may define various fields or attributes that are used to contain various types of information about the object. For example, the object model may define any number of simple attributes, such as "author," "creation date," "modification date," etc. The object model may also define any number of complex attributes, such as "content" and other more involved attributes. During an export, XML files are generated by a source system utilizing one or more object models to describe the objects being exported. Then, during an import, the XML files are analyzed to map the attributes from the object model of the source system to the attributes that are recognized by the target system, e.g., in accordance with one or more object models associated with the target system. Objects are created in the target system according to a configuration that defines the mapping from the XML files to the simple and complex attributes that are recognized by the target system. The metadata included in the XML files may include object identifiers that identify the object being imported as well as relationship information that describes various ways in which the objects are related to one another.

Objects may be logically related to one another in a number of different ways. These relationships may be embedded in the XML files as relationship information. For example, hierarchical relationship information may define a hierarchical structure of the objects as they relate to one another. As one example of hierarchical relationship information, a document object may be contained within a folder object, which may also be referred to as a directory object. In this example, the hierarchical relationship may describe the folder object as the parent of the document object, and the document object may be described as a child of the folder object. As another example, referential relationship information may describe various references to other objects contained with an object. As an example of referential relationship information, a document object may refer to a number of related resources in a bibliography section of the document object, and the referential relationship may describe the document object as referring to one or more other document objects that are listed in the bibliography. These and other types of relationships between objects may be valuable in understanding the objects in context rather than viewing each object in isolation. As used herein, the terms "relationship" and "relationship information" may be used to describe both hierarchical and referential relationships, as well as any other types of logical relationships.

As shown in FIG. 1, an export of objects from records management system 120 may generate a set of structured electronic documents, e.g., XML files 115, that describe the objects being exported. In some implementations, a single XML file may be generated to describe each of the objects being exported. In other implementations, a single XML file may represent multiple objects, or multiple XML files may be used to represent a single object. The XML files 115 generally conform to the object model used by the source system 105, which may be different from the object model that is used by the target system 110. In systems that utilize multiple object models, different objects or object types may be represented using different object models.

The XML files 115 generated by source system 105 may be received by target system 110. For example, the XML files 115 may be stored on a file server 140 of the target system 110. The file server 140 may store the XML files 115 until the files are chosen for import into the records management system 145 of the target system 110.

Similarly to source system 105, target system 110 may include a records management system 145 that allows users to access various objects stored in the system. The records management system 145 may include a user interface 150 and an object repository 155. The user interface 150 may be a graphical user interface or other type of user interface that allows users of the records management system 145 to access objects stored in the repository 155. The objects in records management system 145 may conform to one or more object models. As shown, target system 110 utilizes object model B 160 to describe the objects contained in the records management system 145. Only one object model is shown for clarity of illustration, but target system 110 and records management system 145 may utilize any number of object models to define the objects stored in repository 155.

In operation, the records management system 145 of target system 110 may import the objects described by the XML files 115 using the processes and techniques described herein. In a first step, a user of the records management system 145 may log in to the user interface 150 and execute an object import tool. The tool may prompt the user to select the XML files 115 for importing from a file storage location, such as file server 140. Upon selecting a set of XML files 115, the records management system 145 may perform a phased importation of the objects represented by the chosen set of XML files 115.

In a first phase, the import tool may cycle through each of the XML files 115, processing each of the files individually to import the particular object represented by each file into the records management system 145. In a second phase, the relationships between the various imported objects may be established in the system. The XML files 115 may be processed in any order, and the phased importation approach allows relationship information between the object being imported and other related objects to be established in the system, independent of the order in which the objects are imported.

The import tool may perform mappings of the information contained in the XML files 115 to information that conforms to the object model, e.g., object model B 160, of the target records management system 145. As shown in environment 100, the object models utilized by source system 105 and target system 110 are different. Namely, source system 105 uses object model A 135, while target system uses object model B 160. The differences between the object models may be minor (e.g., having different attribute names, but including the similar numbers and types of attributes), or the differences may be more significant (e.g., having very different structures, data types, etc.). In either case, for an object to be imported to the target system 110, the XML files are generally mapped to an object model that the target system is configured to recognize.

One of the mappings may be to map an object identifier that is used to identify the object in the source system 105 to an object identifier that is compatible with the target system 110. As an example, the object model of source system 105 may utilize an object identifier that is very long (e.g., a string of over 128 characters), and such an identifier may not be compatible or efficient for use in the target system 110. For example, a long object identifier may be inefficient to use as an index in the target system. In this example, target system 110 may convert the identifier into a form that is compatible for use as an index in a database of the target system.

One form of conversion may be to hash the source identifier using any number of known algorithms. Other known forms of conversion may also be used. In some implementations, multiple operations may be used to perform a conversion. For example, a source identifier may first be hashed to obtain a shorter identifier that is compatible with the target system 110, but the hashed value may not be a unique identifier in itself. As such, the hashed identifier may be combined, concatenated, or otherwise joined with other attributes or portions of attributes associated with the object to obtain an object key that may be used as an index for the object.

During the first phase of processing, the import tool also analyzes each of the XML files 115 to determine whether the object being imported is related to one or more other objects. For example, the XML file 115 may include relationship attributes related to object hierarchy or object references that describe various relationships between and amongst the objects in the system. If the XML file contains such relationship information, the import tool may generate contextual information that defines the relationship between the object being processed and one or more other objects. The related objects may have already been imported into the system, or may not have been imported into the system. The contextual information may include the converted identifier of the object being processed as well as a relational identifier that is associated with the related object. The contextual information may be stored in a work list that is used during second phase processing.

During the first phase of processing, the import tool also imports the objects into the records management system 145, e.g., by storing the objects in repository 155. As described above, the import tool utilizes a configuration to define how the various attributes of the XML files 115 are mapped to the system. In some implementations, the records management system 145 may define one or more programmable configurations that describe how the various attributes included in the XML files are to be mapped to the various fields of the records management system. The programmable configurations may be defined by an administrator who is familiar with both the source object model and the target object model. The first phase may continue as described above until all of the XML files 115 have been processed, and all of the objects have been imported into the records management system 145.

The second phase of processing then establishes the relationships between related objects in the records management system 145. The relationships are established based on the contextual information that was generated during the first phase and stored in the work list. For example, each of the objects and their related objects are referenced in the work list, and during the second phase of processing, the converted identifiers may be used as indices to look up the relationship information that is also stored in the work list. The objects and the related objects may then be linked in system 145 as appropriate.

By using the phased approach described above, the order that the objects are imported into the system does not affect whether relationships may be established between objects in the system. For example, a document object that is hierarchically related to a folder object can be imported before the folder object or after the folder object, and the records management system 145 can establish the appropriate relationships between the objects in either instance.

According to various implementations, the importation of objects into target records management system 145 may include a number of additional features to those described above. For example, each XML file may be processed individually to ensure that, if one or both phases of processing fails for one of the XML files, the remaining XML files may still be processed. In addition, failures or exceptions during one or both of the phases may cause the phase to resume with the next XML file, or the failed XML file may be retried until the import is successful.

As another example, the first phase of processing may provide different compatibility modes that may be used, depending on the particular implementation. In a restrictive mode, the import process is stopped if any of the attribute values is invalid or if data is lost. In a compatible mode, valid attribute values are imported into the system, but invalid attribute values and data loss are ignored. In a brute force mode, both valid and invalid attribute values are imported into the system, and data loss is ignored.

Figure 2A:
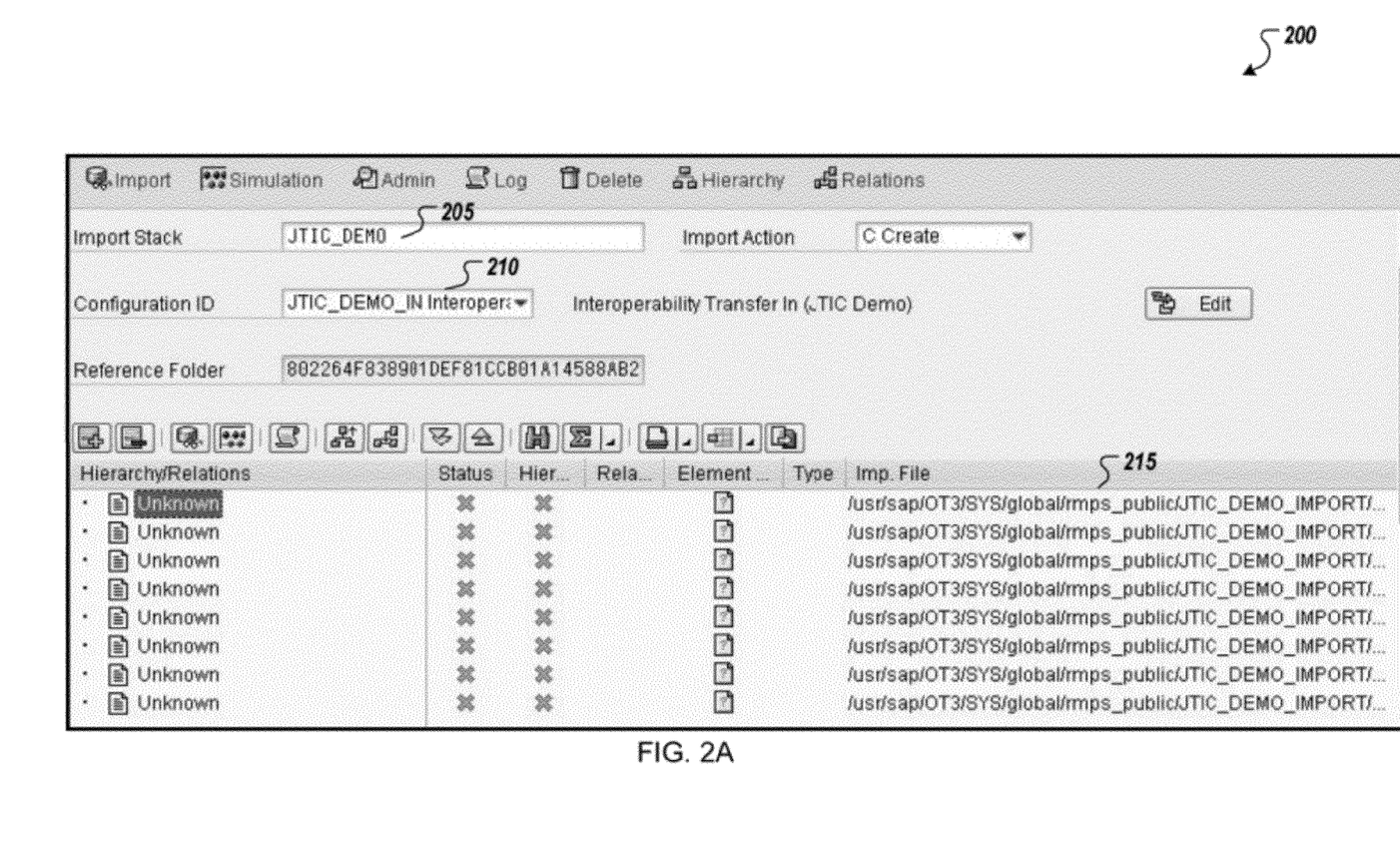
FIGS. 2A-2C show an example user interface for importing objects into a target system.
Figure 2B:
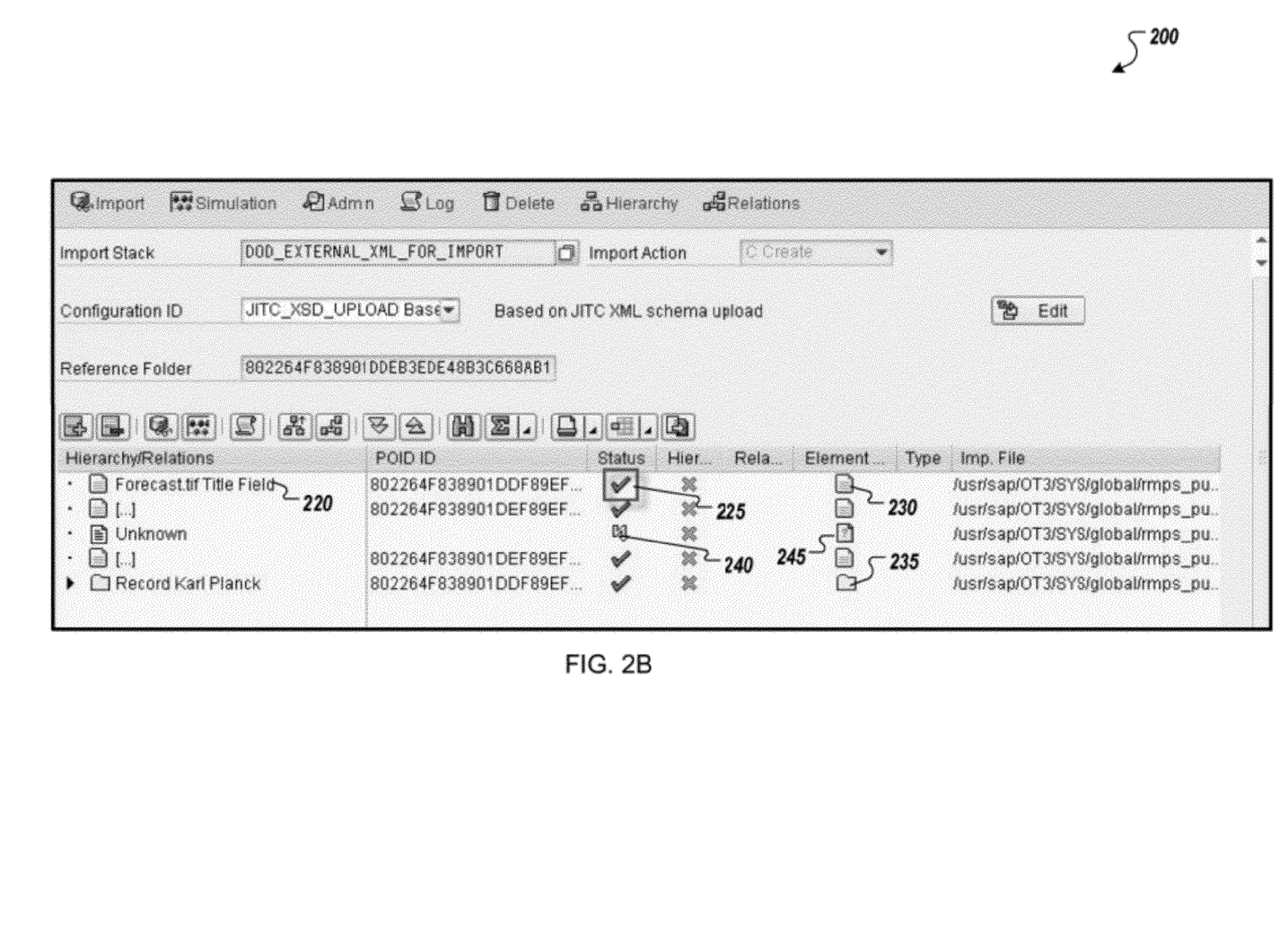
Figure 2C:
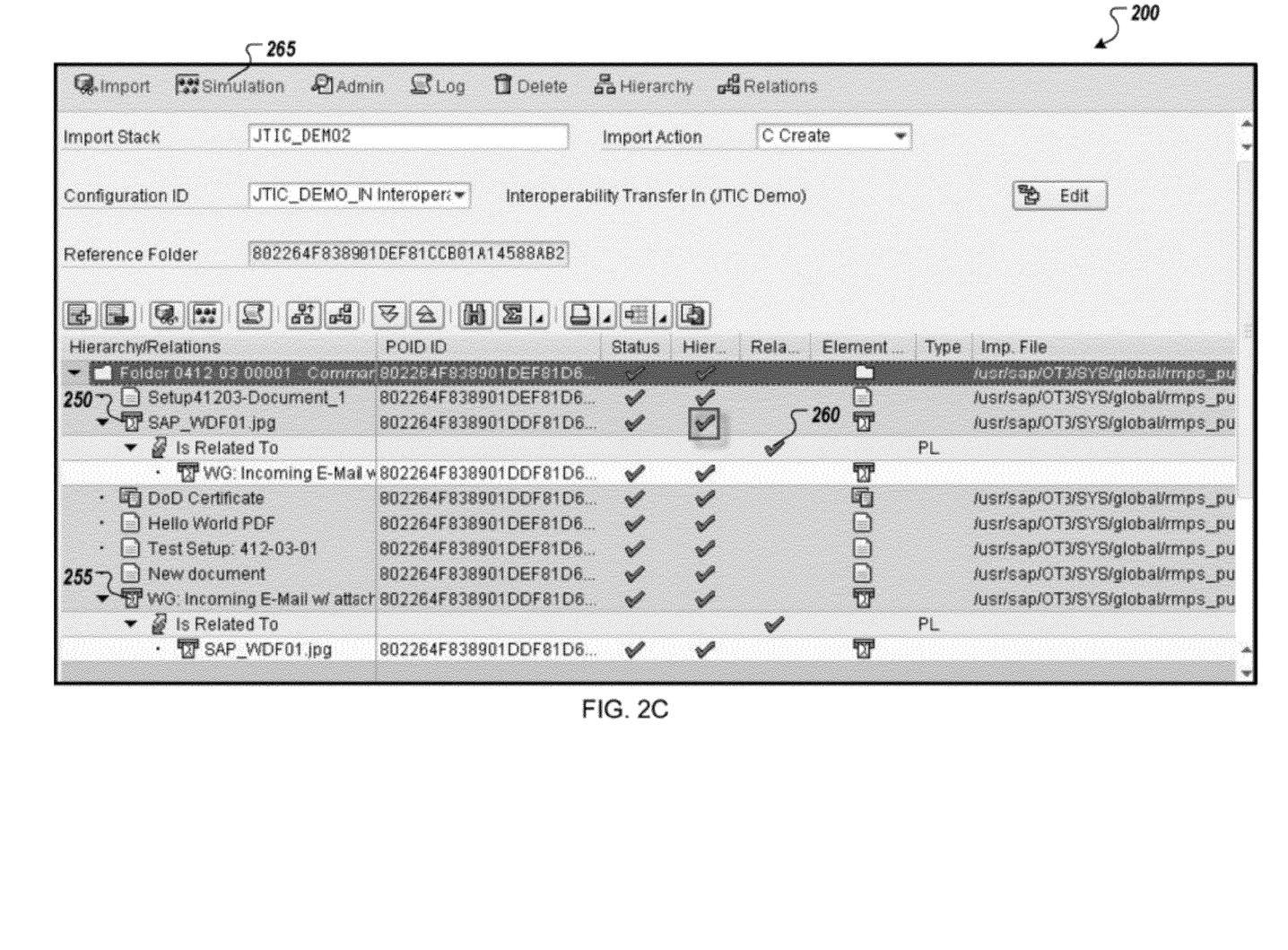

FIGS. 2A-2C show a user interface 200 for importing objects into a target system. User interface 200 is an example of a user interface 150 that may be used as part of records management system 145 in FIG. 1. FIGS. 2A-2C show an example progression of user interface 200 during the various processing stages of the import tool described above.

FIG. 2A shows an import stack 205 that has either been created or opened by a user. For example, upon opening the import tool, the user may choose to open an existing import stack 205 that has previously been created, or may choose to create a new import stack 205. In the case of a new import stack, the user may be prompted to enter or select a configuration 210, which defines the mapping between the XML data and the attributes of the objects to be imported.

The user may also be prompted to select which XML files to import into the system. During this step, the user may either add XML files to the import stack or remove XML files from the import stack. When adding XML files, a search tool may be displayed to guide the user to an appropriate import directory, e.g., a folder on a file server that contains one or more XML files for import. Upon selection of an XML file, the XML file may be added to the import stack. Upon selection of a folder or directory, all of the XML files contained within that structure may be added to the import stack.

The file paths 215 of XML files in the import stack may be displayed in user interface 200. Each of the file paths may represent a single XML file to be imported, which in turn may correspond to a single object to be imported into the system. As shown in FIG. 2A, the XML files have not yet been processed, so the user interface 200 shows the files as having a status of "Not Imported" and the objects are shown as "Unknown."

FIG. 2B shows user interface 200 following a first phase of the import. As shown, object 220 has successfully been imported into the records management system. The object has been assigned an internal identifier within the system, and a checkmark icon 225 may indicate that the object was successfully created in the system. In addition, the object type may be visually displayed through use of icons 230, 235, which allow a user to quickly identify the type of object in the system. In this case, icon 230 may represent an electronic document object type. Other object types may be displayed using different icons, e.g., icon 235, which represents a folder object type. Once the objects have been imported into the records management system, the user may choose to view either the XML file that describes the objects or the object itself by selecting the object in user interface 200, e.g., by double-clicking on the XML file path to view the XML file, or double-clicking on the object name to view the object.

Unsuccessful imports may also be displayed to the user via user interface 200. As shown, icon 240 may represent an object that could not be imported for any of a number of reasons. In this case, the object name is still shown as unknown because the import was unsuccessful. Similarly, the object type is shown as unknown using icon 245.

After the XML files have been imported into the system during the first phase of processing, the hierarchy and relationship information may still be unknown in the system. This is shown in FIG. 2B, where the hierarchy and relationship information is still unavailable. In some implementations, the user may choose to continue processing the import stack in a second phase of processing, either for selected items of the import stack or for the entire stack. In other implementations, the second phase processing may occur automatically, e.g., for all of the objects that were imported successfully. During the second phase of processing, relationships (e.g., object hierarchy, object references, and other logical object relationships) may be established between the related objects in the system as described above.

FIG. 2C shows user interface 200 following the second phase processing. As shown in FIG. 2C, the relationships between various objects in the system has been established, and are presented to the user in graphical form. As shown, object "SAP_WDF01.jpg" 250 is related to object "WG: Incoming E-mail" 255. The relationship is further shown via the relationship checkmark icon 260. Also shown in user interface 200 are the hierarchical relationships amongst the objects that have been imported. As shown, the folder object "Folder 0412-03-00001" contains multiple objects, some of which are further related to one another as shown in the interface.

In some implementations, before the user actually imports the objects represented by the XML files as described above, a simulation may be performed without actually storing any of the objects in the records management system. To initiate a simulation, the user interface 200 may provide a "Simulation" button 265, which may cause the user interface 200 to prompt the user to select various simulation options. For example, the user may be able to choose a simulated import of all or a subset of the XML files in the import stack.

A simulation may allow the user to determine in advance of an import whether the import will be successful. Simulating the import may also allow the user to spot-check the import process to identify plausibility or coherency problems with the configuration, the XML files, or with the import process itself. In some implementations, when a simulation fails, the user may be presented with a log, either per object or for the entire stack, to analyze the reasons that the import failed.

Figure 3:
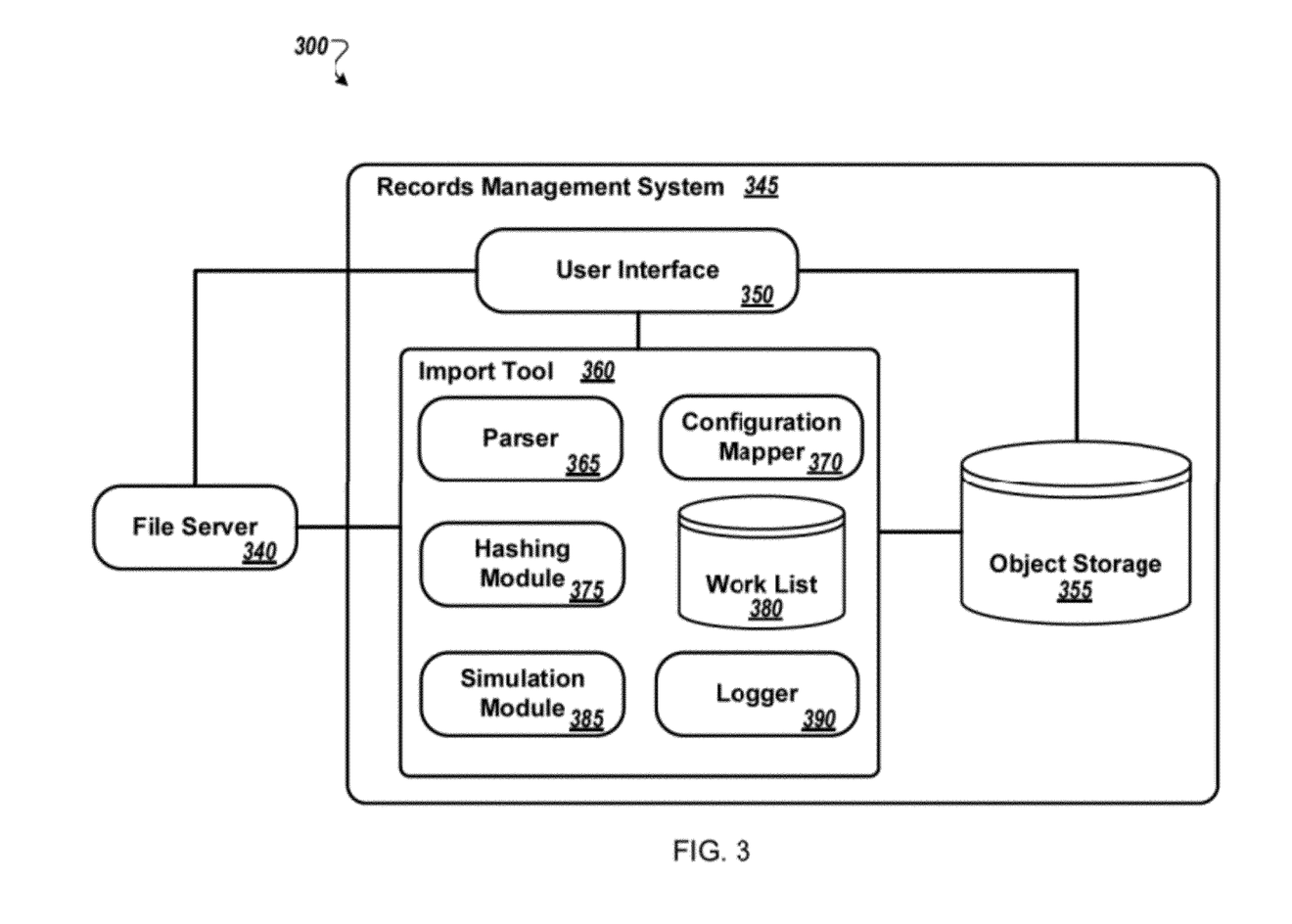
FIG. 3 shows a block diagram of a computer system configured to import objects.

FIG. 3 shows a block diagram of a computer system 300 configured to import objects. The computer system may include a file server 340 and a records management system 345. File server 340 may be used to store XML files that have been exported from other records management systems. In operation, records management system 345 may query file server 340 using any number of known techniques to request the XML files for processing.

Records management system 345 may include a user interface 350, object storage database 355, and an import tool 360. The user interface 350 may allow users to interact with the objects stored in the system. User interface 350 may be a graphical user interface or other type of user interface that allows users of the records management system 345 to access objects stored in object storage database 355. User interface 350 may also provide an interface for import tool 360, and may display screens such as those shown in FIGS. 2A-2C.

Import tool 360 may include a number of different modules and data storage including, for example, a parser 365, a configuration mapper 370, a hashing module 375, a work list 380, a simulation module 385, and a logger 390. Parser 365 may be used to parse the information contained in the XML files, and to provide such information to configuration mapper 370. Configuration mapper 370 may be used, e.g., during a first phase of processing, to map the various attributes contained within the XML file to corresponding fields of the records management system 345. Configuration mapper 370 may utilize a number of different configurations defined in the system for various mapping operations. For example, configuration mapper 370 may include a configuration for each different object type to be imported. Configuration mapper 370 may also be used to generate contextual information to populate work list 380 with relationship information to be used during the second phase of processing.

Hashing module 375 may be used to hash object identifiers. For example, in some implementations, the object identifiers may be hashed to ensure that the identifiers are compatible for use, e.g., as an index, in the records management system 345. In particular, the hashed object identifiers may be used as indices to work list 380 where the relationship information is stored during the first phase of processing.

Simulation module 385 may be used to simulate an import without actually importing the objects into records management system 345. Simulation module 385 may provide a number of options associated with the simulation. Example options may include the ability to choose which of the XML files in an import stack to process during the simulation; to define one or more criteria that determine whether the simulation was successful; or to identify different configurations for simulation. Such simulations may allow a user to determine in advance of an import whether the import will be successful. Simulating the import may also allow the user to spot-check the import process to identify plausibility or coherency problems with the configuration, the XML files, or with the import process itself. In some implementations, when a simulation fails, the user may be presented with a log, e.g., as generated by logger 390, either per object or for the entire stack, to analyze the reasons that the import failed.

Logger 390 may be used to generate and/or access a log of the import process, including any exceptions or failures that occur during the process. In some implementations, each of the XML files and corresponding objects may have a distinct status and a log associated with each phase of processing. The log may be associated with each of the XML files or with the objects in the system, or both.

Figure 4:
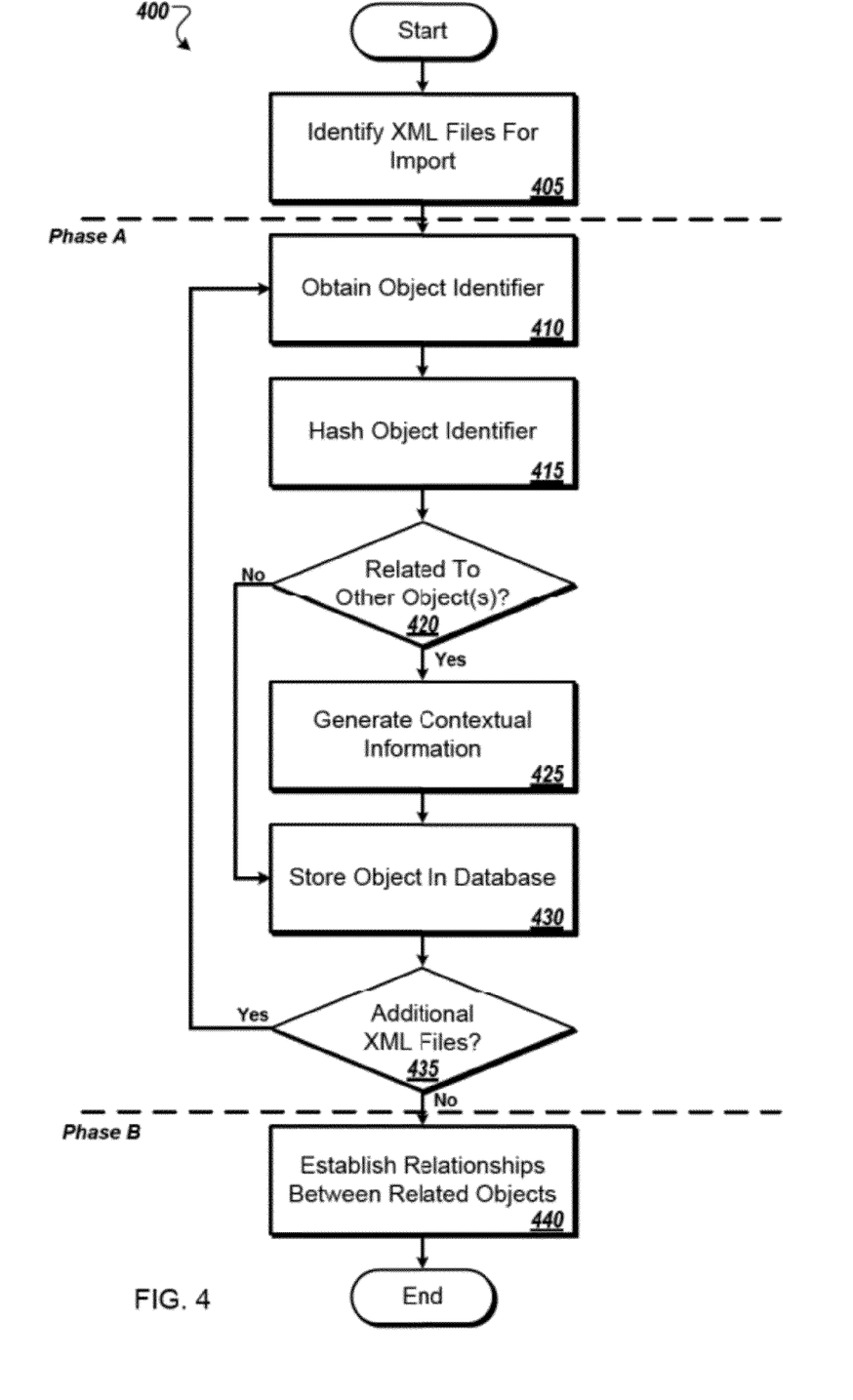
FIG. 4 shows a flowchart of an example process for importing objects.

FIG. 4 shows a flowchart of an example process 400 for importing objects. The process 400 may be performed, e.g., by the system of FIG. 3, to import objects into a database of a records management system. The process 400 may be performed in two separate phases, as indicated by the dashed lines. Although process 400 shows the phases executing serially, with the first phase preceding the second phase, the first phase and the second phase may also execute in parallel in some implementations.

At box 405, the computer system identifies XML files for import. For example, a user of the records management system may select a folder on a file server that contains a set of XML files for import into the system. Each of the XML files represents an object that is to be imported into the records management system. Example objects may include electronic documents, printed documents, folders, etc.

Boxes 410-435 represent first phase processing, and may be completed for each of the XML files identified for import. At box 410, the computer system obtains an object identifier from the XML file. For example, the system may parse the XML file to locate an "Object Identifier" attribute based on the configuration of the XML file. Depending on the object model associated with the source system, the object identifier for one or more of the objects to be imported may be in a format that is incompatible for use as an index in the records management system database.

Because the object model is unpredictable, a converted identifier is generated by hashing the object identifier at box 415. By hashing the object identifier, the system may ensure that the converted identifier is compatible for use as an index in the database. The conversion process may be further enhanced by combining, concatenating, or otherwise joining the converted identifier with other attributes or portions of attributes associated with the object to obtain an object key that may be used as an index for the object.

At box 420, the computer system analyzes the XML file to determine whether the object being imported is related to one or more other objects. For example, the XML file may include attributes related to object hierarchy or object references that describe various relationships between and amongst the objects in the system. For example, the XML file may describe various parent/child attributes to describe the hierarchy of the objects in the system. As another example, the XML file may describe referential information, such as a document object that includes a reference to another document object.

If the XML file does not contain such relationship information, the computer system stores the object in the database at box 430, and the first phase cycle is repeated if any additional XML files are awaiting import at box 435.

If the XML file contains such relationship information, the computer system generates contextual information at box 425. The contextual information may define the relationship between the object being processed and one or more other objects from the import stack, either that have already been imported into the system, or that have yet to be imported into the system. The contextual information may include the converted identifier of the object being processed as well as a relational identifier that is associated with the related object. In some implementations, the contextual information is stored for later use, e.g., during second phase processing, regardless of whether the related object has already been imported into the system. In other implementations, if the related object has already been imported into the system, the relationship between the object being processed and the related object may be established in the system during the first phase.

At box 430, the computer system stores the object in the database, and the first phase processing of the current object is complete. At box 435, the computer system determines if any additional XML files are awaiting import. If so, the first phase process begins again with the next XML file at box 410.

After all of the XML files have been processed in the first phase, process 400 continues to the second phase. During the second phase, the computer system establishes the relationships between related objects in the system at box 440. The relationships are established based on the contextual information that was generated during the first phase.

In this manner, the order that the objects are imported into the system does not affect whether relationships may be established between the objects. For example, a document object that is hierarchically related to a folder object (e.g., the document is located within the folder), can be imported before the folder object or after the folder object, and the computer system can establish the appropriate relationships between the objects in either instance.

Figure 5:
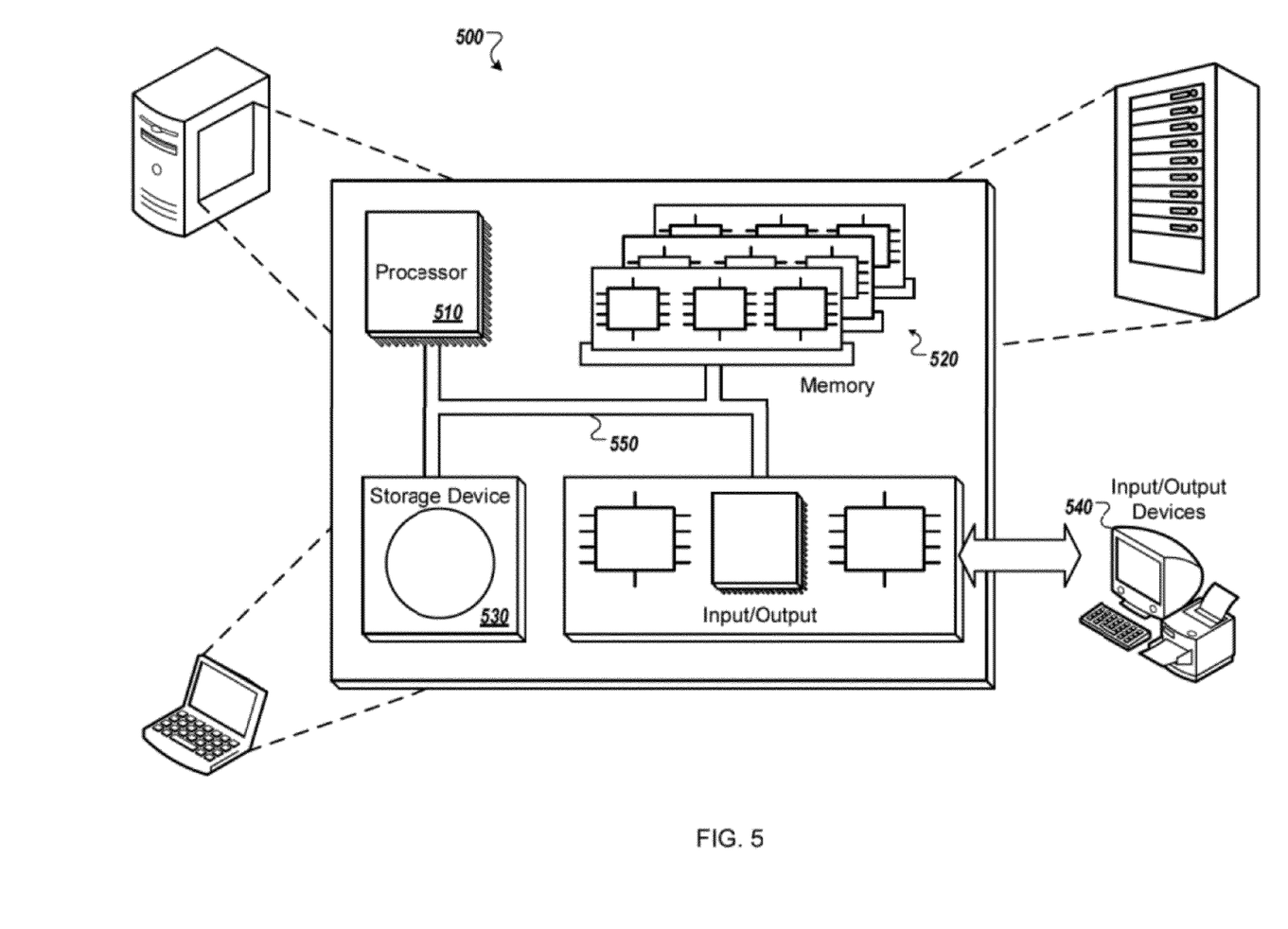
FIG. 5 is a block diagram of a computing device that may be used to implement the systems and methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and BLU-RAY ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for importing objects, the method comprising:
   identifying, using a computer system, a plurality of structured electronic documents, each of which defines an object to be imported into a database;
   processing, using the computer system, the plurality of structured electronic documents in a first phase that comprises, for each of the structured electronic documents:
      analyzing the structured electronic document to obtain an identifier associated with the object to be imported, the identifier being incompatible for use as an index in the database;
      generating a converted identifier from the identifier associated with the object to be imported, the converted identifier being compatible for use as an index in the database;
      analyzing the structured electronic document to determine whether the object to be imported is related to one or more other objects defined by the plurality of structured electronic documents that have yet to be stored in the database, and if so, generating contextual information that defines a relationship between the object to be imported and the one or more other objects, the contextual information including the converted identifier and a relational identifier for each of the one or more other objects; and
      storing the object defined by the structured electronic document in the database; and
   processing, using the computer system, the contextual information in a second phase that comprises at least establishing relationships in the database between related objects using the contextual information;
   wherein the processing of the first phase either: i) precedes the processing of the second phase; or ii) occurs in parallel with the processing of the second phase.

2. The method of claim 1, further comprising, during the first phase processing, determining that the object to be imported is related to an object that is stored in the database, and establishing a relationship in the database between the object to be imported and the object that is stored in the database.

3. The method of claim 1, wherein generating the converted identifier comprises hashing the identifier associated with the object to be imported.

4. The method of claim 1, further comprising simulating at least a portion of the first phase processing and the second phase processing without storing the objects in the database.

5. The method of claim 4, wherein a subset of the plurality of structured electronic documents is used during the simulation, the subset being fewer than all of the plurality of structured electronic documents.

6. A computer-readable storage device storing instructions that, when executed by one or more processing devices, perform operations comprising:
   identifying, using a computer system, a plurality of structured electronic documents, each of which defines an object to be imported into a database;
   processing, using the computer system, the plurality of structured electronic documents in a first phase that comprises, for each of the structured electronic documents:
      analyzing the structured electronic document to obtain an identifier associated with the object to be imported, the identifier being incompatible for use as an index in the database;
      generating a converted identifier from the identifier associated with the object to be imported, the converted identifier being compatible for use as an index in the database;
      analyzing the structured electronic document to determine whether the object to be imported is related to one or more other objects defined by the plurality of structured electronic documents that have yet to be stored in the database, and if so, generating contextual information that defines a relationship between the object to be imported and the one or more other objects, the contextual information including the converted identifier and a relational identifier for each of the one or more other objects; and storing the object defined by the structured electronic document in the database; and processing, using the computer system, the contextual information in a second phase that comprises at least establishing relationships in the database between related objects using the contextual information;

wherein the processing of the first phase either: i) precedes the processing of the second phase; or ii) occurs in parallel with the processing of the second phase.

7. The computer-readable storage device of claim 6, wherein the operations further comprise, during the first phase processing, determining that the object to be imported is related to an object that is stored in the database, and establishing a relationship in the database between the object to be imported and the object that is stored in the database.

8. The computer-readable storage device of claim 6, wherein generating the converted identifier comprises hashing the identifier associated with the object to be imported.

9. The computer-readable storage device of claim 6, wherein the operations further comprise simulating at least a portion of the first phase processing and the second phase processing without storing the objects in the database.

10. The computer-readable storage device of claim 9, wherein a subset of the plurality of structured electronic documents is used during the simulation, the subset being fewer than all of the plurality of structured electronic documents.

11. A system comprising:

one or more programmable processors; and a computer-readable storage device storing instructions that, when executed by the one or more programmable processors, perform operations comprising:

identifying, using a computer system, a plurality of structured electronic documents, each of which defines an object to be imported into a database;

processing, using the computer system, the plurality of structured electronic documents in a first phase that comprises, for each of the structured electronic documents:

analyzing the structured electronic document to obtain an identifier associated with the object to be imported, the identifier being incompatible for use as an index in the database;

generating a converted identifier from the identifier associated with the object to be imported, the converted identifier being compatible for use as an index in the database;

analyzing the structured electronic document to determine whether the object to be imported is related to one or more other objects defined by the plurality of structured electronic documents that have yet to be stored in the database, and if so, generating contextual information that defines a relationship between the object to be imported and the one or more other objects, the contextual information including the converted identifier and a relational identifier for each of the one or more other objects; and storing the object defined by the structured electronic document in the database; and processing, using the computer system, the contextual information in a second phase that comprises at least establishing relationships in the database between related objects using the contextual information;

wherein the processing of the first phase either: i) precedes the processing of the second phase; or ii) occurs in parallel with the processing of the second phase.

12. The system of claim 11, wherein the operations further comprise, during the first phase processing, determining that the object to be imported is related to an object that is stored in the database, and establishing a relationship in the database between the object to be imported and the object that is stored in the database.

13. The system of claim 11, wherein generating the converted identifier comprises hashing the identifier associated with the object to be imported.

14. The system of claim 11, wherein the operations further comprise simulating at least a portion of the first phase processing and the second phase processing without storing the objects in the database.

15. The system of claim 14, wherein a subset of the plurality of structured electronic documents is used during the simulation, the subset being fewer than all of the plurality of structured electronic documents.

* * * * *